United States Patent
Satterfield

[11] 3,914,035
[45] Oct. 21, 1975

[54] FILM TRANSPORT AND REGISTRATION SYSTEM FOR MOTION PICTURE CAMERA

[76] Inventor: Paul M. Satterfield, 737 N. Seward St., Hollywood, Calif. 90038

[22] Filed: Feb. 4, 1974

[21] Appl. No.: 439,098

[52] U.S. Cl. .................. 352/191; 352/225; 226/55
[51] Int. Cl.² .......................................... G03B 1/22
[58] Field of Search .......... 352/191, 192, 193, 194, 352/195, 196, 225, 227; 226/55, 56, 57, 58

[56] References Cited
UNITED STATES PATENTS

| | | | |
|---|---|---|---|
| 1,390,247 | 9/1921 | Leonard | 352/192 |
| 3,700,318 | 10/1972 | Cunningham | 352/227 |

*Primary Examiner*—Monroe H. Hayes
*Attorney, Agent, or Firm*—Max Geldin

[57] ABSTRACT

Camera particularly designed for use in animation photography, embodying as essential features, film transport and registration systems operating in conjunction with each other, the film transport system comprising means in the form of pull-down pins for capturing the film following exposure of one frame thereof, and moving the film laterally from one frame to the next frame, the film registration or transfer system comprising an aperture plate and a pressure plate, and designed to lift the film, by means of the aperture plate, from off fixed pilot pins onto the pull-down pins of the transport system, and following transport of the film from one frame to the next frame, to strip the film from the pull-down pins, by means of the pressure plate, and back onto the fixed pilot pins in readiness for the next exposure. As an important feature, means are provided for "ironing out" the film between the pressure plate and the aperture plate as the film is registered onto the pilot pins, to place the film in its most desirable flat and registered condition during exposure of the film to the image being photographed. The film registration system including the pressure plate and aperture plate are particularly designed for proper seating of the film for exposure, and to maintain the film and film gate free and clean from specks of lint, dust, and the like.

23 Claims, 12 Drawing Figures

FILM TRANSPORT AND REGISTRATION SYSTEM FOR MOTION PICTURE CAMERA

BACKGROUND OF THE INVENTION

This invention relates to a camera designed particularly for use in animation photography, and having utility also as a camera and/or projector in optical printing, and is particularly concerned with the provision of systems and mechanisms in such camera, affording precise registration of the photographic film during exposure, and following exposure, providing transport of the film to the next frame of film to be exposed.

Photographic cameras for application to both animation and optical printing require precise registration of the film in order to obtain high quality results. In optical printing, for example, it is vital to obtain precise registration in order to make a steady picture on the screen. In one type of prior art camera, fixed pilot pins, and a fixed aperture plate, arm employed for film registration, and the device lifts and seats the film by means of a two-leafed shuttle, which combines a lifter plate which straddles the aperture plate, and a pressure plate fixed in relation to the lifter plate. Various disadvantages are inherent in this prior art device. Thus, the film path through the shuttle of such device is fixed in width and jamming often occurs particularly where there is a thick splice in bi-packed film. Further, if a piece of lint is caught on the edge of the aperture plate, which often happens, the shuttle tamps it down tighter with each cycle of movement, with no tendency to brush it off. In order to clean the mechanism of such prior art device, it is necessary to disassemble it, which is not only time consuming but requires a skilled mechanic for this purpose.

The disadvantages of the film registration systems of prior art cameras such as that noted above, are avoided according to the present invention. It is accordingly an object of the present invention to provide a fixed pilot pin system for the precise registration of a photographic film for exposure in a camera, and including a transport mechanism which can deliver the film to such fixed pilot pin system in a precise manner, and including a pressure system and means to transfer the film onto the pilot pins and hold it flat for exposure. A further object of the invention is to provide a film registration mechanism which provides a variable width film path between the pressure plate and aperture plate, and which avoids jamming of the film between such plates, particularly at the location of a thick film splice as in bi-pack use. Still another object is the provision of a film registration mechanism of the above type which provides a lifting and seating action for the film which tends to dust off any lint or dirt on the aperture plate. A particular object of the invention is the provision of film registration mechanism incorporating means to iron out the film following its registration on the fixed pilot pins so as to flatten out the entire area of the film pressed against the aperture plate by the pressure plate, for efficient exposure of the film.

DESCRIPTION OF THE INVENTION

The above objects are achieved according to this invention by the provision of a camera which embodies a unique combination of film transport and film registration systems or mechanisms within the camera, such transport and registration systems cooperating with each other in a timed sequence for precise registration of the film for exposure of one frame, and following exposure, to transport the film for registration and exposure of the following frame. The transport mechanism comprises a pull-down system which transports the film frame by frame, either forward or reverse. Such pull-down system comprises a sliding device which is movable laterally in a reciprocable manner by means of a cam. The sliding device carries depending pull-down pins which are positioned to capture the film from the film registration mechanism following exposure of one frame of the film, for transport of the film and to permit registration thereof for exposure of the next frame. The film registration or transfer mechanism comprises film lifter and seater assemblies which include an aperture plate and a lifter-seater arm both hinged on a common axis, such arm carrying a pressure plate which has a spring biased connection to the lifter-seater arm. The pressure plate is bevelled at its opposite ends and has a relatively large flat area between the bevelled ends to provide a relatively large contact area of the pressure plate with the film positioned between the pressure plate and the aperture plate during registration of the film and exposure thereof. The lifter-seater arm carries a lifter catch at its lower end which is designed to contact the outer end of the aperture plate for lifting the aperture plate, together with the pressure plate, so as to lift the film, following exposure thereof, from fixed pilot pins onto the pull-down pins of the pull-down mechanism. Following transport of the film to the next frame, the lowering of the lifter-seater arm permits stripping of the film off the pull-down pins of the transport mechanism, by means of the pressure plate, and seating the film firmly onto the fixed pilot pins for precise registration of the film for exposure of another frame.

The above mechanism including the spring biased connection of the pressure plate to the lifter-seater arm, in conjunction with the lifter catch on the lifter-seater arm, is designed so that during lifting or upward movement of the lifter-seater arm and just prior to and at contact of the lifter catch thereon with the pressure plate, the pressure plate is tilted with respect to the aperture plate. Due to this tilted attitude of the pressure plate with respect to the aperture plate, during downward movement of the lifter-seater arm and just prior to and following release of the lifter catch on the lifter-seater arm, from contact with the aperture plate, one end of the pressure plate first makes contact with the film against the aperture plate, and the pressure plate then rocks down from a point adjacent one of the fixed pilot pins, over the film in an ironing out movement, until the entire flat surface of the pressure plate is in contact with the film. The bevelled ends of the pressure plate facilitates this ironing out operation, which completes the precise registration of the film upon the fixed pilot pins for efficient exposure of the film..

The upward and downward rocking motion of the lifter-seater assemblies, including the lifter-seater arm and the associated aperture plate and pressure plate, is provided by connection of the lifter-seater arm with another cam. The cam which provides reciprocal or lateral movement of the pull-down mechanism for transport of the film from one frame to the next frame, and the cam for providing upward and downward movement of the arm of the lifter-seater assembly are mounted on a common axis for rotation thereon, and are designed so that the relative timing of the movements of the transport and lifter-seater assemblies are properly synchronized. Thus, when the camera is running, the cams are turning continuously so that during actuation of the film transport assembly for movement of the film from an exposed frame to an unexposed frame for registration thereof, the lifter-seater system for registration of the film remains inactive or is in a hold or dwell position, and when the lifter-seater system is actuated for either removing the film from the fixed pilot pins onto the pull-down pins of the transport system, or during stripping of the film from the pull-down pins and onto the fixed pilot pins during registration of the film, the pull-down system remains inactive, that is, in a hold or dwell position. At no time during a cycle of movement are both of these assemblies moving. In effect, one system, e.g. the pull-down system, moves or is actuated to set the stage for actuation of the other system, e.g. the lifter-seater system, and dwells, then the other system such as the lifter-seater system moves to set the stage for the first system such as the pull-down system, and dwells.

The film transport and registration system of the invention provides for rapid and precise delivery of a film to fixed pilot pins and for transfer and registration of the film onto the pilot pins and maintaining it flat on the aperture plate for exposure. The only variation in registration which can occur employing the invention system is in the precision of the perforations in the film, and the photograpic film now being marketed is quite precisely perforated. The invention system for transport and registration of a film in a camera is particularly effective in the removal of any dust or lint which may lodge on the aperture plate and in maintaining the film gate clean. Another advantage of the invention system is in its freedom from jamming particularly when unusually thick spliced film is employed, since the film path between the relatively movable aperture plate and pressure plate is variable. Also, the invention system is relatively gentle in handling the film and will not scratch the film, due to absence of any pressure on the film during its transport. Of particular importance, the registration system of the invention device is designed so that the pressure plate is initially tilted with respect to the aperture plate, so that only one end of the pressure plate first contacts the film during registration and seating thereof, and as seating of the film continues the pressure plate rocks down on the film to apply pressure over the entire area of the film in contact with the aperture plate.

Although the camera embodying the film transport and registration system of the invention has been designed especially for use in animation photography, it also has utility in cameras for producing certain special effects and in projectors for optical printing, and the like. Thus, it is particularly useful in cameras used in optical work to obtain optical effects, due to its precision of registration in both mono-pack and multi-pack loading.

The invention will be more clearly understood from a description below of a preferred embodiment, taken in connection with the accompanying drawings wherein.

Figure 1:
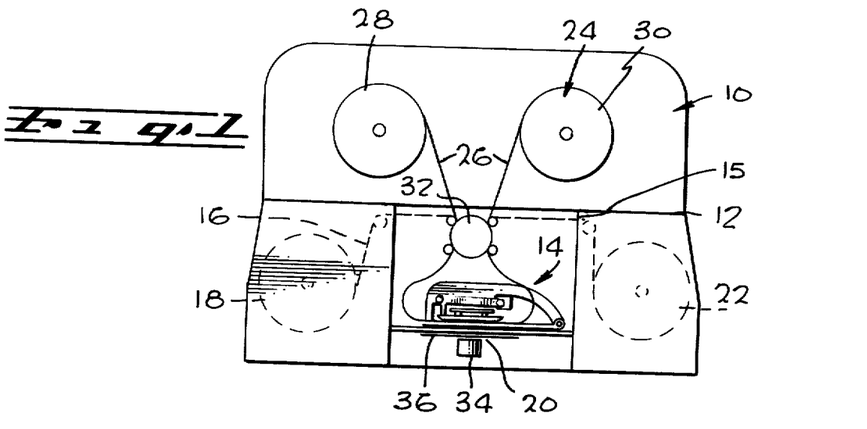
FIG. 1 illustrates generally a camera designed particularly for use in animation photography, embodying the combination film transport and registration system of the invention.

Referring to FIG. 1 of the drawing, numeral 10 indicates a camera, particularly designed for animation photography, comprising a light-tight housing 12, containing the combination film transport and registration system of the invention, indicated at 14. The camera contains a magazine indicated at 24 for feeding the raw stock or unexposed film 26 from a reel 28 through the film transport and registration system 14 for exposure, and onto a take-up reel 30, including a film guiding system 32 for the film 26. An optical system illustrated at 34 is suitably attached or mounted on the camera housing in front of a shutter 36 mounted for actuation on the film transport and registration system 14, for timed exposure of the film 26, as described in greater detail below.

In bi-pack work for production of optical effects as well as for use in animation work, there is also provided a light trap indicated at 15, to feed a second film indicated at 16, containing images to be photographed or printed, from a reel 18 into the camera, the film 16 being bi-packed with film 26 and the bi-pack fed through the invention system 14. Following exposure at 20, film 26 exits the camera and is wound on take-up reel 22. This alternative bi-pack system is shown in dotted lines in FIG. 1.

Figures 2, 3:
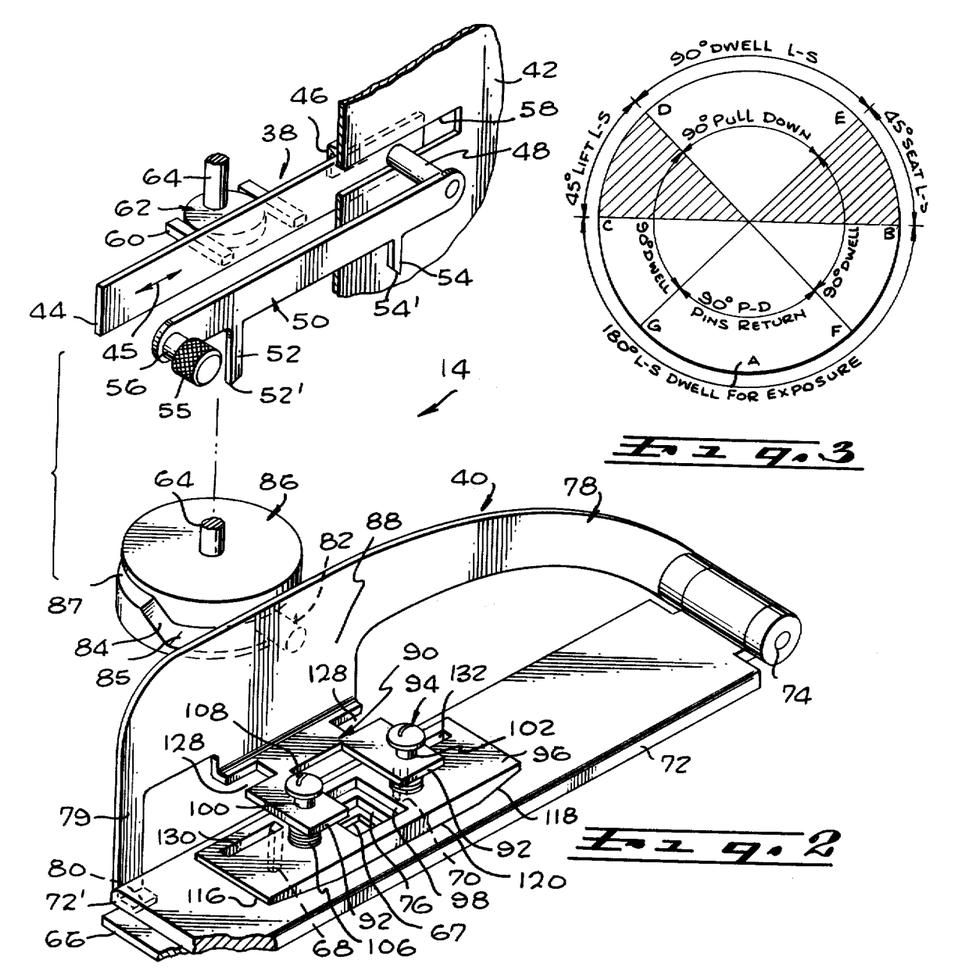
FIG. 2 is an exploded view, in perspective, of the film transport assembly and the film registration assembly.
FIG. 3 illustrates the relative timing for one cycle of operation, of the movements of the transport system and of the film registration or transfer system, shown in FIG. 2, with respect to each other.

Referring now particularly to FIG. 2, the film transport and registration assembly 14 is comprised essentially of two mechanisms, a transport mechanism indicated at 38 and a film registration or transfer mechanism indicated at 40, the assembly 14 comprising the mechanisms 38 and 40 being positioned adjacent a wall 42 of the camera. The transport or pull-down mechanism 38 comprises a slideable plate 44 which is mounted for reciprocal longitudinal movement, as indicated by the arrow 45, in a guide member or housing 46, made of bearing metal, mounted on the outer side of wall 42. A pivot 48 connects one end of the slideable plate 44 with a pull-down arm 50, arm 50 carrying a pair of depending spaced pull-down pins 52 and 54, positioned adjacent opposite end portions of arm 50, pins 52 and 54 being disposed substantially normal to the pull-down arm 50. Pin 52 is bevelled at its lower end as indicated at 52' and pin 54 is bevelled at its lower end in the opposite direction, as indicated at 54', for a purpose which will be pointed out hereinafter. Arm 50 carries at its end opposite pivot 48, a handle 55 mounted on an arm 56. Pull-down arm 50 is shown in its normal position in FIG. 2, but can be raised by means of handle 55, around pivot 48 for threading film to the camera, as described hereinafter. It is noted that wall 42 is provided with a longitudinally extending slot 58 to receive the pivot 48 during reciprocal movement of the sliding plate 44 and pull-down arm 50 connected thereto. Plate 44 carries on its outer side and extending from the opposite side of wall 42 from the pull-down arm 50, a cam fork 60 (see also FIG. 4) which is driven by a suitably designed cam 62 for timed reciprocal lateral motion of the cam fork 60 and the attached plate 44 carrying pull-down arm 50. Cam 62 is mounted on a drive shaft 64, driven by a conventional motor (not shown).

Figure 4:
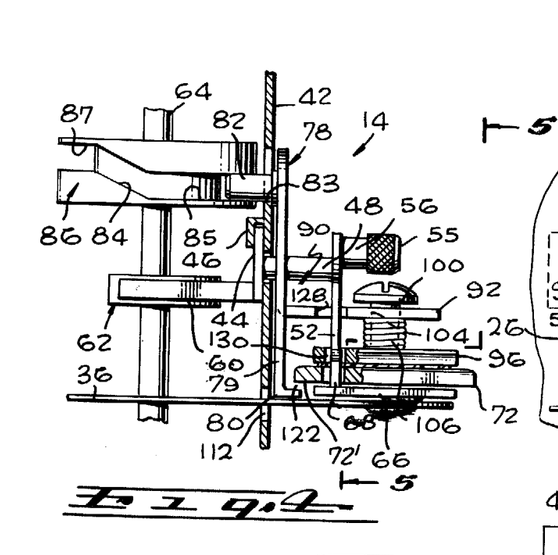
FIG. 4 is an end view of the assembled transport and registration mechanisms shown in FIG. 2 in the pressure stage, ready for exposure of the frame of film over the aperture.
Figure 5:
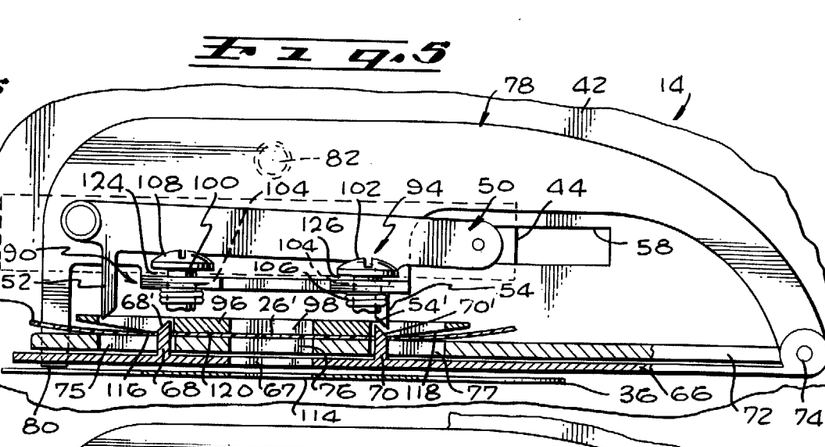
FIG. 5 is a front partial sectional view taken on line 5—5 of the assembly shown in FIG. 4.

Referring to FIGS. 2, 4 and 5, the registration mechanism 40 comprises a base 66 which is mounted in suitable manner on the camera wall 42, the base carrying a pair of suitably aligned spaced fixed pilot pins 68 and 70, and having an aperture 67 to permit exposure of the film 26. It will be seen, particularly viewing FIG. 5, that the left upwardly extending pilot pin 68 has a bevelled upper end 68' and the right upwardly extending pilot pin 70 is bevelled at its upper end at 70', the bevelled end 70' sloping in a direction opposite to the bevelled end 68'. The pull-down pins 52 and 54 and pull-down arm 50 positioned above the fixed pilot pins 68 and 70, are in the same vertical plane as pivot pins 68 and 70. The longitudinal distance between the pull-down pins 52 and 54 is greater than the longitudinal distance between the fixed pilot pins 68 and 70 by a distance equal to one frame of the film 26. In the normal position of the pilot pins 52 and 54, as seen in FIG. 5, that is, during exposure of the film, the right pull-down pin 54 (viewing FIG. 5) is positioned directly over and in vertical alignment with the right pilot pin 70, it being noted that the bevelled end 54' of pin 54 is disposed adjacent the bevelled end 70' of pin 70, the bevels 54' and 70' sloping in the same direction and substantially parallel, with a small clearance between the bevelled ends of the pins 54 and 70, so that there is an overlapping of these bevelled ends of pins 54 and 70.

Similarly, in the position illustrated in FIG. 10, following transport of the film for a distance of one frame following exposure, as will be described in greater detail hereinafter, the left pull-down pin 52 is disposed directly over and in vertical alignment with the left pilot pin 68, the bevelled ends 52' and 68', respectively, of such pins also sloping in the same direction and being disposed parallel to each other, with a small clearance between such bevelled end portions, such that there is also an overlapping at this stage between the bevelled ends of these pins. The pilot pins 52 and 54 may be positioned at a slight angle with respect to the pilot pins 68 and 70.

Figure 9:
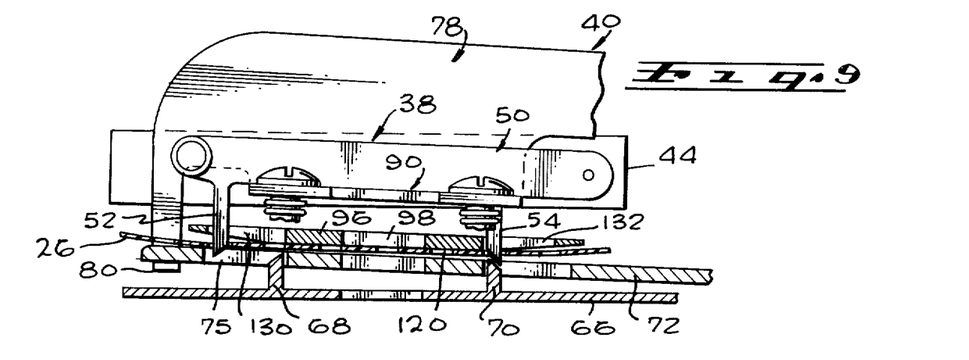
FIG. 9 is a front view similar to FIG. 8, but wherein the lifter-seater arm has been raised a distance so as to transfer the film from the fixed pilot pins to the pull-down pins of the film transport mechanism.

The registration mechanism or pull-down system 40 is also provided with an aperture plate 72 which is hinged at 74, so that in its lowermost position, as shown in FIG. 5, aperture plate 72 is in a substantially horizontal plane, but can be raised or lifted in a clockwise direction, viewing FIG. 5, at the hinge 74. The aperture plate has an aperture 76 for exposing a frame of the film 26 in the camera. Aperture plate 72 also has a first slot 75 for receiving the left pilot pin 68 and a second slot 77 for receiving the right pilot pin 70, slots 75 and 77 being of sufficient size to prevent binding when aperture plate 72 is lifted with respect to base plate 66, as illustrated in FIG. 9. Further, slot 75, as seen in FIG. 9, is of sufficient length to receive the left pull-down pin in the upper tilted position of the aperture plate 72.

Figure 8:
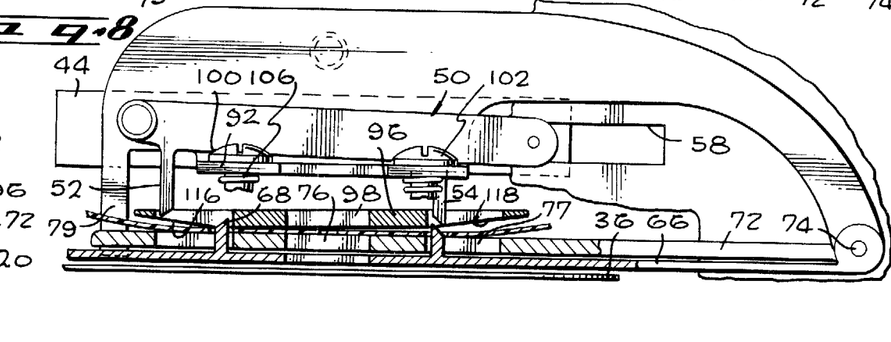
FIG. 8 is a front view similar to FIG. 6 of the mechanism in its position shown in FIG. 7, illustrating at this stage the tilting of the pressure plate with respect to the aperture plate.

Referring again to FIGS. 2, 4 and 5, the transfer mechanism 40 further comprises a lifter-seater arm 78, hereinafter referred to as an L-S arm, which is mounted for pivotal motion also on the common axis of the hinge 74 for the aperture plate 72. The L-S arm 78 carries at its outer end a depending extension 79 which is provided at its lower edge with an outwardly extending lifter catch 80 in the form of a lug, such lifter catch being disposed below the inner edge portion 72' of the aperture plate 72. Thus, viewing FIG. 5, when the L-S arm 78 is tilted upwardly in a clockwise direction, the lifter catch 80 will make contact with the aperture plate 72, as illustrated in FIG. 8, and will also tilt the aperture plate in a clockwise direction upon further upward tilting movement of the L-S arm 78. The L-S arm 78 carries on its outer side a roller 82 which extends outwardly normal to the plane of the L-S arm 78, through an aperture 83 in the upper portion of camera wall 42, to the opposite side of wall 42. Roller 82 rides within the groove 84 of a cam 86 which is mounted on the same drive shaft 64 as cam 62, and positioned above cam 62. The groove 84 of cam 86 extends entirely around the cam and has a low portion 85 and a high portion 87. Thus, when the roller 82 is travelling in the low portion 85 of cam 86, the L-S arm 78 and lifter catch 80 are in their lowermost position, as shown in FIGS. 4 and 5, and when the roller 82 rides in the high portion 87 of cam 86, the L-S arm 78 and lifter catch 80 are in their uppermost clockwise tilted position, as illustrated in FIGS. 9 and 10.

The L-S arm 78 carries on a lower intermediate portion 88 an outwardly extending bracket 90 positioned above the lifter catch 80, as best seen in FIG. 4. The bracket 90 carries a pair of spaced bracket portions 92 which support a floating spring biased system, indicated at 94, which in turn carries at its lower end a pressure plate 96. The pressure plate 96 has longitudinal slots 130 and 132 therein to receive the lower ends of the pull-down pins 52 and 54, respectively, for longitudinal movement of such pins and to receive the upper ends of the pilot pins 68 and 70. Pressure plate 96 has a central aperture 98 therein which is in vertical alignment with the apertures 76 and 67 of aperture plate 72 and base 66, respectively. The spring biased connection 94 to pressure plate 96 comprises a pair of studs 100 and 102 each mounted for vertical slideable movement in a hole 104 in each of the bracket portions 92. Each of the studs 100 and 102 is connected at its lower end to the pressure plate 96 for supporting same on the L-S arm 78. A compression spring 106 is positioned around each of the studs 100 and 102, one end of each of these springs being in contact with the lower surface of bracket portions 92, the other end of the springs 106 abutting the upper surface of the pressure plate 96. Accordingly, it will be seen that the springs 106 urge both of the studs 100 and 102 in a downward direction, tending to urge the heads 108 of both of the studs into contact with the upper surface of bracket portions 92, and thus tending to maintain the pressure plate in its lowermost position as illustrated in FIG. 8.

Viewing FIG. 4, mounted on the drive shaft 64 at a position below both of the cams 86 and 60 is the shutter 36 which is of conventional type, and which passes through a hole 112 in the camera wall 42 to permit rotation of the shutter, the outwardly extending portion of the shutter located a short distance below the base plate 66. The shutter 36 is designed or apertured at 114 so as to expose the film 26 through apertures 67 and 76, during a 180° arc or rotation of the entire 360° rotation of the shutter.

The operation of the invention device is as follows: The handle 55 of the pull-down arm 50 of the pull-down system 38, is manipulated to pivot or tilt arm 50 upwardly in a clockwise direction around pivot 48 so as to lift the pull-down pins 52 and 54 upwardly, and the forward portion of the film 26 to be exposed is passed sidewise from the right viewing FIG. 4 between the aperture plate 72 and the pressure plate 96, and suitably aligned notches 115 (see FIG. 4) which are conventionally positioned along an edge of the film, are registered with the fixed pilot pins 68 and 70, and the film pushed down over the pins so as to position the film flat against aperture plate 72, with the first frame 26' of the film, to be exposed, in position over aperture 76 in aperture plate 72.

The system, as illustrated in FIG. 5, is now in its pressure stage, with the pressure plate 96 in contact with the film on the aperture plate 72, over the entire surface of the pressure plate between the fixed pilot pins 68 and 70. It is noted that the pressure plate 96 is provided with upwardly sloping or bevelled end portions 116 and 118, forming a toe and heel, respectively, the intermediate central lower surface or sole 120 of the pressure plate being flat or planar for complete contact thereof with that portion of the film containing the frame to be exposed. In the pressure stage of the device as shown in FIG. 5, the frame of film 26' over the aperture 76 of the aperture plate is ready for exposure. Such exposure takes place during a 180° rotation of the drive shaft 64, corresponding to a 180° rotation of the shutter 36 and the 180° arc A of the circle illustrating one cycle of movements shown in FIG. 3, extending from point B on the circle to the diametrically opposite point C on the circle. During this period it is noted that the film is firmly pressed down onto the fixed pilot pins 68 and 70 by pressure from the L-S arm 78 through the springs 106 around the studs 100 and 102. Note that in this position there is a gap 122 between the lifter catch 80 and the aperture plate 72. It is also noted that due to the compression of the bracket 90 by the L-S arm 78, springs 106 around studs 100 and 102 are compressed, leaving gaps 124 and 126 between the heads 108 of the studs 100 and 102, and the respective bracket portions 92. It is further noted that the gap 124 under the left stud 100, viewing FIG. 5, is greater than the gap 126 under the head of stud 102.

Figure 6:
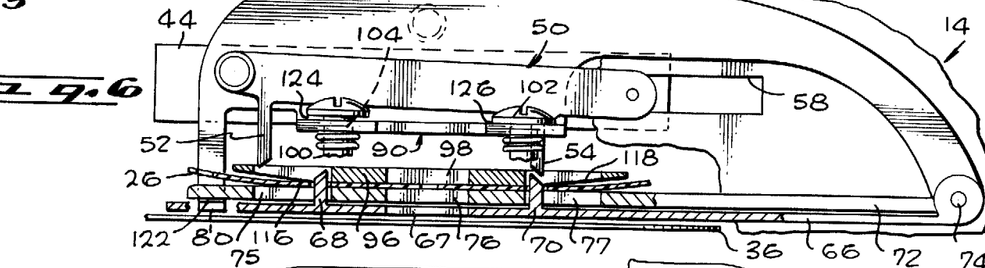
FIG. 6 is a front view similar to FIG. 5, illustrating the relationship of certain parts of the mechanism, following exposure of the film and just at the start of the lifting of the lifter-seater arm.

Following completion of the exposure of frame 26' of the film, and commencing at point C on the circle of FIG. 3, and proceeding clockwise around this cycle timing circle, rotation of cam 86 causes the roller 82 to commence to ride upwardly in the groove 84 of the cam, and thus to commence the "lift" cycle. This causes the L-S arm 78 to move upwardly, that is, to rotate clockwise around 74 to the position illustrated in FIG. 6. In this position, it is noted that the gap 126 under the right stud 102 has closed, but that there is still a gap 124 under the head of the left stud, which has decreased in width during such period of lifting of the L-S arm 78 from the position of FIG. 5 to that of FIG. 6. Also, at this stage, there is still a gap 122 between the lifter catch 80 and the aperture plate 72, but this gap has also decreased in width. The change in size of the gaps 124 and 126 under the heads of the studs 100 and 102, respectively, when proceeding from the position shown in FIG. 5 to that shown in FIG. 6, is due to the fact that during this period the aperture plate 72 remains in a fixed horizontal position, whereas the bracket 90 on the L-S arm 78, moves upwardly toward the heads of the studs 100 and 102. However, during this period of upper movement of the bracket 90, the pressure plate 96 also remains fixed against the aperture plate 72, due to the continued compressive force applied by the springs 106 against the pressure plate.

Figure 7:
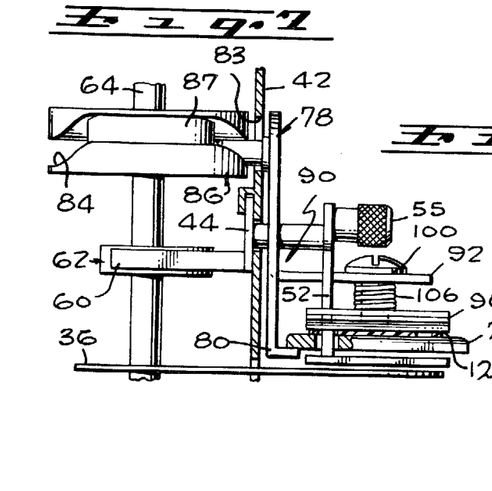
FIG. 7 is an end view similar to FIG. 4, showing the relation of the parts as upward movement of the lifter-seater arm continues and the lifter catch thereof makes initial contact with the aperture plate.

The lifter-seater cam 86 continues to rotate, causing the roller 82 to continue to ascend in groove 84 of the cam, further lifting the L-S arm 78, until the condition illustrated in FIGS. 7 and 8 is reached. Here, both of the gaps 124 and 126 under the heads of the studs 100 and 102, respectively, are now closed, and the gap 122 between the lifter catch 80 and the aperture plate 72 is also closed. Thus, at this point the bracket portions 92 are in contact with the heads of the studs 100 and 102, and the lifter catch is in contact with the aperture plate 72. However, during lifting of the L-S arm from the position of FIG. 6 to that of FIG. 8, the heel portion 118 of pressure plate 96 is lifted away from aperture plate 72, due to continuous contact of the head of stud 102 with its bracket portion 92, while the toe portion 116 of pressure plate 96 remains in contact with the film on aperture plate 72 until the head of stud 100 contacts the adjacent bracket portion 92, as shown in FIG. 8. It is thus seen in FIG. 8 that the pressure plate 96 is now tilted with respect to the aperture plate 72, leaving a greater space between the heel 118 of the pressure plate and the aperture plate, than between the toe 116 of the pressure plate and the aperture plate.

As the lift of the L-S arm 78 continues, with the lifter catch 80 in contact with the aperture plate 72, the aperture plate 72 now commences to be lifted or rotated around hinge 74, together with the pressure plate 96, while the relative tilted attitude of the pressure plate 96 with respect to the aperture plate 72 shown in FIG. 8 is maintained.

As the cam 86 continues to rotate and the roller 82 rises to the high portion 87 of the cam groove 84, with the L-S arm 78 thus continuing to lift to the position illustrated in FIG. 9, it is seen that the aperture plate 72 has now lifted the film 26 off of the fixed pilot pins 68 and 70, onto the pull-down pins 52 and 54. Note that the overlapping of the pilot pin 70 and the right pull-down pin 54, as previously pointed out, facilitates the capturing of the film by the pull-down pins during this lifting phase. Also, it will be noted that throughout the lifting phase from the position shown in FIG. 8 to that shown in FIG. 9, the same relative tilted attitude of the pressure plate 96 with respect to the aperture plate 72 prevails.

Figure 10:
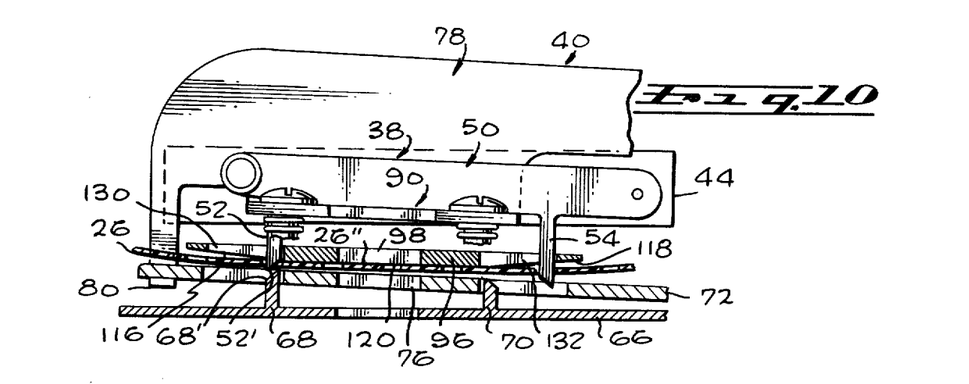
FIG. 10 is a view similar to FIG. 9, and illustrates movement or transport of the captured film by the transport or pull-down system to a forward position where the next frame is now properly positioned for registration and seating of the film on the aperture plate for exposure.

At this point, the cam 62 of the pull-down mechanism 38 urges the pull-down arm 50 to the right, viewing FIGS. 2 and 9, to a position as illustrated in FIG. 10, wherein the left pull-down pin 52 is positioned directly over and in vertical alignment with the left fixed pilot pin 68, the right pull-down pin 54 now being positioned forward of the right pilot pin 70, for a distance of one film frame. This action now places the next film frame 26'' to be exposed, over the aperture 76 in the aperture plate 72. It will be noted in FIGS. 9 and 10 that pull-down arm 50 is disposed substantially parallel to the aperture plate 72 in its uppermost lifted position, at an angle to the horizontal, and the lateral movement of arm 50 as noted above, is also substantially parallel to the aperture plate 72 in such lifted position.

The period of movement of the lifter-seater mechanism 40 from the position shown in FIG. 5 to the position shown in FIG. 9, indicated as the lifting phase, is illustrated by the 45° portion of the circle illustrating the cycle of movements in FIG. 3, from points C to D. The subsequent pull-down movement, wherein the film is transported by the pull-down mechanism 38, from its position shown in FIG. 9 to that shown in FIG. 10 to place the next frame of film 26'' in position for exposure, is illustrated by the 90° portion of the circle between points D and E in FIG. 3.

It is noted that during the longitudinal movement of the pull-down arm 50 from FIG. 9 to FIG. 10, the pull-down pins 52 and 54 have clearance for longitudinal movement since they are disposed in the longitudinal slots 128 in bracket 90, viewing FIGS. 2 and 4, and in the longitudinal slots 130 and 132 in the pressure plate 96, at opposite end portions thereof. Also the slot 75 in the left end of the aperture plate 72, viewing FIG. 9, permits free longitudinal movement of pull-down pin 52 during such movement.

During the pull-down operation carried out, and proceeding from the position of FIG. 9 to FIG. 10, the lifter-seater mechanism 40, including the lifter arm 78 thereof remains inactive.

Figure 11:
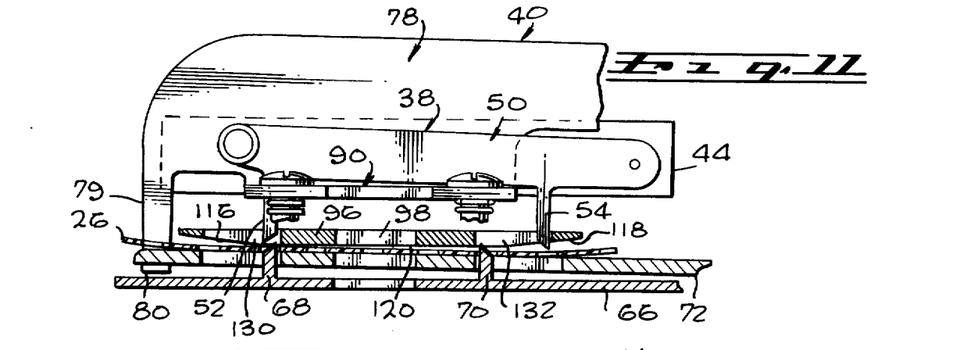
FIG. 11 is a view similar to FIG. 10 showing the stripping of the film by the pressure plate, from the pull-down pins of the transport mechanism onto the fixed pilot pins.

Following the pull-down movement to the position shown in FIG. 10, the continued rotation of the lifter-seater cam 86 starts the re-seating movement. In this movement, the roller 82 descends from the high point 87 of the groove in cam 86, causing the L-S arm 78 to move down or rotate counterclockwise from its position shown in FIG. 10. As the L-S arm 78 moves down, the pressure plate 96 strips the film off of the pull-down pins 52 and 54 and onto the pilot pins 68 and 70 as shown in FIG. 11. During this downward movement of L-S arm 86, the relative tilted attitude of the pressure plate 96 with respect to the aperture plate 72 is maintained.

Figure 12:
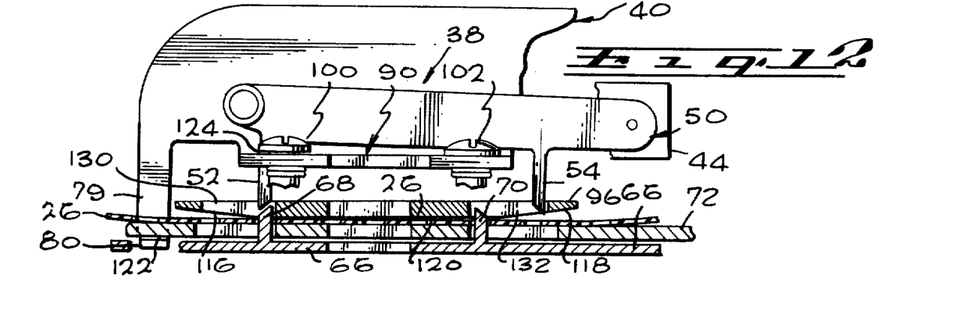
FIG. 12 illustrates the "ironing out" of the film by the pressure plate, for precise registration of the film with respect to the aperture.

When the position of the parts shown in FIG. 12 is reached, the toe 116 of the pressure plate 96 is in contact with the film 26 at a point midway alongside the master pilot pin 68, and seats the film at that point firmly down onto the pilot pin 68. In this position, the hinged aperture plate 72 is now in its lowermost horizontal location. With such continued downward movement of the L-S arm 78 to the position shown in FIG. 12, the lifter catch 80 is released from the aperture plate, and the application of pressure to pressure plate 96, by the spring biased system 94 including the springs 106, commences, and the gap 122 between the lifter catch 80 and the aperture plate 72 commences to form, and the gap 124 also commences to form below the head of the left stud 100, as seen in FIG. 12.

Now as the cam 86 continues to rotate and the roller 82 moves to the lower portion 85 of the cam groove 84, and thus moving the L-S arm 78 and bracket 90 to the lowermost position, as illustrated in FIG. 5, the right end of the pressure plate, viewing FIG. 12, commences to move downward in relation to the left end of the pressure plate adjacent pilot pin 68, which remains stationary, and additional pressure is exerted by the springs 106 against the pressure plate 96, and such additional pressure applied to the pressure plate causes the pressure plate to rock down over the film in an "ironing out" movement, until the pressure plate 96 reaches its horizontal or parallel position with respect to aperture plate 72, with the entire central or sole portion 120 of the pressure plate 96, between the pilot pins 68 and 70, in contact with the film 26, to thereby flatten out the film to place it in its best and most desirable condition for receiving the exposure through the optical system 34. This is a particularly important feature of the mode of operation of the invention device.

With the film seated and ironed out, the positions of the pressure plate studs and springs 106, and the lifter catch 80 are as shown in FIG. 5. The seating phase proceeding from FIG. 10 through FIG. 12 and to FIG. 5, corresponds to the 45° angle of movement from points E to B on the circle of movements in FIG. 3. During this period the pull-down system 38 will dwell and remain in inactive position. The pull-down system 38 including the pull-down pins 52 and 54 will also dwell or remain inactive in the forward position illustrated in FIG. 12 for an additional 45° angle of the circle of movements in FIG. 3, after the shutter 36 opens for exposure at point B, such additional dwell period being represented by the arc from points B to F on the circle of FIG. 3. At the end of this 45° dwell period, and while exposure of the film continues, the pull-down cam 62 reaches a position causing the pull-down arm 50 and its associated pull-down pins 52 and 54 to move or reciprocate to the left, viewing FIGS. 2 and 12, until the pull-down system 38 reaches the position shown in FIG. 5. This return of the pull-down system takes place free of contact of the pull-down pins 52 and 54 with the film. This operation takes place over a 90° portion of the circle of movements shown in FIG. 3, from points F to G. Thereafter, during the subsequent 45° period from points G to C on the circle of movements in FIG. 3, while exposure of the film still continues, the pull-down system 38 is in the dwell position. After exposure of the film has been completed in the position of the parts shown in FIGS. 4 and 5, corresponding to point C on the circle of movements, the lifter seating system 40 is again activated to lift the exposed film in another cycle of movements as described above.

Thus, it is seen from the cycle of action illustrated in FIG. 3, that during the activation of the lifter-seater system 40, for lifting the film from the aperture plate following exposure for capture by the pull-down system 38, proceeding from points C to D on the cycle of movements, and during the seating of the film by the pressure plate 96 onto the aperture plate 72, proceeding from points E to B on the cycle of movements, the pull-down system 38 remains in an inactive or dwell position. Also, when the pull-down system 38 is activated for transporting the exposed film for a distance of one frame to expose an additional frame of film, proceeding from points D to E on the cycle of movements, and during return of the pull-down mechanism following transport and seating of the next frame of film on the aperture plate, proceeding from points F to G on the cycle of movements, the lifter-seater system 40 is in a dwell position and remains inactive. At no time during a cycle of movement are both of these two systems 38 and 40 moving. Thus, one of the systems moves to set the stage and dwells, and then the other system moves to set the stage for the first system, and dwells. It is further seen that in one cycle of movements the lifter-seater system 40 passes through two cycles of lifting the film and seating it, and the pull-down system 38 passes through two cycles of movement to transport the exposed film for exposure of the next frame, and to return to its initial movement free from contact with the film, ready for the next transport movement.

It will be understood that suitable conventional means are provided for taking up the film 26 on the take-up reel 30, as the film is exposed, and where bi-pack is used, means synchronized with the movement of film 26, is provided for winding the stock film 16 on take-up reel 22 as it is photographed.

The film transport and registration system of the invention has a number of advantages over prior art systems. In the first place, the aperture plate in effect forms a long arm which moves the film off the pilot pins and onto the pull-down pins in a relatively flat arc for more efficient registration of the film with both the pilot pins and the pull-down pins. Further, the aperture plate provides a large area of seating of the film in conjunction with the pressure applied by the pressure plate. Due to the spring mounting of the pressure plate the width of the film path between the pressure plate and the aperture plate is variable and will permit passage of an unusually thick spliced portion of film without jamming. Further, in the invention system, the film pull-down operation and/or the lifting and seating action of the lifter-seater mechanism will tend to dust off any lodged lint or dirt on the film. In addition, the pull-down arm 50 can be lifted by rotating the arm clockwise (viewing FIG. 2) around pivot 48 to its up position, where it can be held by suitable means (not shown), and with the lifter catch 80 released so that it is in its lower position out of contact with the aperture plate 72, the film path between the pressure plate and aperture plate is opened sufficiently wide for easy cleaning. This also exposes the pilot pins 68 and 70 and pull-down pins 52 and 54 for easy cleaning. The invention device also permits easy threading of both monopack and bi-pack. Moreover, the operation of the transport mechanism 38 and the lifter-seater mechanism 40 does not scratch the film as there is no pressure on the film during transport.

In the invention system with two pull-down pins, one forward and one aft the aperture, when the film is lifted off the pilot pins and onto the pull-down pins, one or the other of the pull-down pins is in position directly over one of the pilot pins, and the pilot pins and pull-down pins are bevelled at their tips to afford an overlapping, thus permitting the film to be readily captured during transfer from pilot to pull-down pins, during the pull-down operation, and back onto the pilot pins after the pull-down operation.

Since the pressure plate is bevelled at its opposite ends, with its tilted attitude with respect to the aperture plate when the seating transfer of the film commences, only the toe of the pressure plate will first touch the film to push the film firmly down onto the master pilot pin and as the seating action continues the pressure plate rocks down across the film to cause it to seat evenly over the greatest possible area of the aperture plate.

From the foregoing, it is seen that the invention provides a unique combination film transport and registration system which although particularly designed for use in photographic animation, can be employed in other types of cameras.

While I have described certain preferred embodiments of the invention for purposes of illustration, it will be understood that the invention is not to be taken as limited except by the scope of the appended claims.

I claim:

1. In a camera, the combination of film transport and film registration systems cooperating with each other in a timed sequence for registration of a film for exposure of one frame, and following exposure, to transport the film for registration and exposure of another frame, said film transport system comprising means for intermittent lateral motion of said film, said film registration system comprising a base member, pilot pin means extending from base member, an aperture plate positioned adjacent said base member, an arm, said aperture plate and said arm hinged on a common axis, a pressure plate mounted on said arm, said pilot pin means being arranged for positioning a film between said aperture plate and said pressure plate, said pressure plate and said aperture plate being disposed substantially parallel to each other in the seated position of said film on said pilot pin means, means for lifting said arm and said aperture plate together on said axis, to transfer said film by said aperture plate from said pilot pin means to said film transport system, and following transport of said film by said film transport system, for lowering said arm together with said pressure plate and said aperture plate, to transfer said film from said transport system to said pilot pin means by said pressure plate, for seating said film on said aperture plate, and means for tilting said pressure plate with respect to said aperture plate during said lifting of said arm, said pressure plate in said tilted position rocking down over said film in said seated position on the aperture plate.

2. In a camera as defined in claim 1, said means for lifting said arm and said aperture plate together including a catch member on said arm adapted to engage said aperture plate, and said film transport system comprising pin means.

3. In a camera, the combination of film transport and film registration systems cooperating with each other in a timed sequence for registration of a film for exposure of one frame, and following exposure, to transport the film for registration and exposure of another frame, said film transport system comprising a slideable member which is movable laterally in a reciprocable manner, pull-down pin means depending from said slideable member, said film registration system comprising a base member, fixed pilot pin means extending from said base member, a hinged aperture plate positioned adjacent said base member, a hinged arm, said aperture plate and said arm hinged on a common axis, a pressure plate, said pressure plate mounted on said arm adjacent said aperture plate, a spring biased connection between said pressure plate and said arm, said pressure plate being disposed adjacent to and spaced from said aperture plate, said pilot pin means being adapted for seating a film on said pilot pin means between said aperture plate and said pressure plate, said aperture plate and said pressure plate being substantially parallel in said seated position of said film therebetween, means on said arm arranged to contact said aperture plate during lifting of said arm from its initial position, to lift said aperture plate together with such pressure plate away from said base member, and thereby to lift said film from said pilot pin means by said aperture plate, and capture said film on said pull-down pin means of said film transport system, said slideable member carrying said pull-down pin means and said captured film being movable laterally a predetermined distance to another predetermined position of said film, said film at said last-mentioned predetermined position being stripped from said pull-down pin means by said pressure plate and then seated on said aperture plate and registered on said pilot pin means, during downward movement of said arm to its initial position, together with said aperture plate and said pressure plate, means associated with said spring biased connection so that during said lifting and downward movement of said arm, said pressure plate has a slight tilt with respect to said aperture plate, whereby upon seating of said film on said aperture plate and in registration with said pilot pin means, said pressure plate makes contact with said film on said aperture plate substantially at one point, and then rocks down on the film as the pressure plate returns to its initial position corresponding to the initial position of said arm, until a substantial area of the surface of said pressure plate is in contact with said film.

4. The device as defined in claim 3, including means for moving said slideable member of said film transport system laterally in one direction and then in the opposite direction, while said film registration system remains inactive, and means for actuating said arm of said film registration system to lift said film onto said film transport system and then to strip said film from said transport system and to seat same on said pilot pin means, said actuating means for said film registration system being inactive while said moving means for said film transport system is in operation.

5. The device as defined in claim 4, said moving means for said slideable member of said film transport system comprising a first cam means and said actuating means for lifting and lowering said arm of said film registration system comprising a second cam means.

6. A device as defined in claim 5, wherein said first cam means and said second cam means are mounted on a common drive shaft for synchronized rotation of said first and second cam means.

7. A device as defined in claim 3, said pressure plate being bevelled at its opposite ends to facilitate said rocking motion of said pressure plate with respect to said aperture plate.

8. A device as defined in claim 3, said spring biased connection between said pressure plate and said hinged arm comprising a bracket member connected to said arm, stud means connected to said pressure plate and supporting said pressure plate on said bracket member, spring means associated with said stud means, said stud means arranged to permit relative movement between said bracket member and said pressure plate, said spring means normally biasing said pressure plate away from said bracket member; and said means on said hinged arm arranged to make contact with said aperture plate comprising an extending lug.

9. A device as defined in claim 3, said spring biased connection between said pressure plate and said arm comprising a bracket member, a plurality of studs passing through said bracket member and mounted for slideable movement thereon, the heads of said studs abutting said bracket member, said studs being connected to said pressure plate and supporting said pressure plate on said bracket member, a compression spring mounted around each of said studs, said compression spring abutting said pressure plate and said bracket member at opposite ends, said springs normally biasing said pressure plate away from said bracket member, with the heads of said studs in contact with said bracket member; and said means on said hinged arm arranged to contact said aperture plate being an outwardly extending lug mounted at a lower end of said hinged arm and adapted to contact an end portion of said aperture plate when said hinged arm is lifted.

10. A device as defined in claim 9, said lug in the lowermost position of said hinged arm being disposed a short distance below the aperture plate, so that when said arm is raised and first makes contact with said aperture plate, said pressure plate carried on said arm is caused by said spring biased stud connection to tilt said pressure plate with respect to said aperture plate.

11. A device as defined in claim 3, said fixed pilot pin means comprising at least two pilot pins, one of said pilot pins being a master pilot pin, said pilot pins being received in apertures in said aperture plate and permitting lifting of said hinged aperture plate and lowering thereof with respect to said pilot pins, said pull-down pin means comprising a plurality of pull-down pins, said pull-down pins being disposed in substantially the same plane as said pilot pins, at least one of said pull-down pins being disposed opposite to and in alignment with at least one of said fixed pilot pins during the lifting of said hinged arm and the capture of said film on said pull-down pins, and at least one of said pull-down pins being positioned opposite to and in alignment with at least one of said fixed pilot pins, during stripping of said film from said pull-down pins for seating on said pilot pins, during downward movement of said arm to its initial position.

12. The device as defined in claim 11, wherein said slideable member of said film transport system carrying said depending pull-down pins is disposed for movement laterally in a direction substantially parallel to the aperture plate in the raised uppermost position of said hinged arm and aperture plate, and wherein said pilot pins and said pull-down pins each has a bevelled end, the ends of oppositely disposed aligned pull-down and pilot pins having substantially parallel bevelled ends which are disposed a short distance from each other when the film is transferred from the pilot pins to the pull-down pins, and when the film is stripped from the pull-down pins for registration on the pilot pins.

13. The device as defined in claim 12, said pressure plate being bevelled at its opposite ends, the central portion of said pressure plate end disposed between the fixed pilot pins being substantially flat, whereby during the lowering of said hinged arm to transfer said film from said pull-down pins to said pilot pins, said tilted pressure plate first makes contact with said film against said aperture plate adjacent said master pilot pin and thereafter rocks down over the film until the entire surface of said pressure plate disposed between said pilot pins is in contact with said film, thereby ironing out the film for registration and seating on said aperture plate.

14. The device as defined in claim 11, said pressure plate containing a slot for receiving and permitting longitudinal movement of the lower end portions of said pull-down pins.

15. A device as defined in claim 6, said spring biased connection between said pressure plate and said arm comprising a bracket member, a plurality of studs passing through said bracket member and mounted for slideable movement thereon, the heads of said studs abutting said bracket member, said studs being connected to said pressure plate and supporting said pressure plate on said bracket member, a compression spring mounted around each of said studs, said compression spring abutting said pressure plate and said bracket member at opposite ends, said springs normally biasing said pressure plate away from said bracket member, with the heads of said studs in contact with said bracket member; and said means on said hinged arm arranged to contact said aperture plate being an outwardly extending lug mounted at a lower end of said hinged arm and adapted to contact an end portion of said aperture plate when said hinged arm is lifted, and including a shutter disposed for rotation below said aperture plate, said shutter being mounted for rotation on said common drive shaft for said first and second cam means, and synchronized for opening said shutter for exposure of said film while said hinged arm of said film registration system is in its lowermost position and remains inactive.

16. The device as defined in claim 15, wherein said slideable member of said film transport system is reciprocated in said opposite direction while said shutter is opened for exposure of said film, and during inactivation of said film registration system.

17. The device as defined in claim 15, said pressure plate being bevelled at its opposite ends to facilitate the rocking motion of said pressure plate with respect to said aperture plate, said fixed pilot pin means comprising at least two pilot pins, including a master pilot pin, said pilot pins being received in apertures in said aperture plate and permitting lifting of said hinged aperture plate and lowering thereof with respect to said pilot pins, said pull-down means comprising a plurality of pull-down pins, said pull-down pins being disposed in substantially the same plane as said pilot pins, at least one of said pull-down pins being disposed opposite to and in alignment with at least one of said fixed pilot pins during the lifting of said hinged arm and the capture of said film on said pull-down pins, and at least one of said pull-down pins being positioned opposite to and in alignment with at least one of said fixed pilot pins, during stripping of said film from said pull-down pins for seating on said pilot pins, during downward movement of said arm to its initial position, and wherein said slideable member of said film transport system carrying said depending pull-down pins is disposed for movement laterally in a direction substantially parallel to the aperture plate in the raised uppermost position of said hinged arm and aperture plate, said pressure plate containing a slot for receiving and permitting said movement of the lower end portions of said pull-down pins, and wherein said pilot pins and said pull-down pins each has a bevelled end, the ends of oppositely disposed pull-down and pilot pins having substantially parallel bevelled ends which are disposed a short distance from each other when the film is transferred from the pilot pins to the pull-down pins, and when the film is stripped from the pull-down pins for registration on the pilot pins.

18. The device as defined in claim 3, said film transport system comprising a slideable plate, a pull-down arm pivotally mounted on said slideable plate, said pull-down pin means comprising a pair of spaced pins depending from said pull-down arm, a first cam connected to said slideable plate for lateral movement of said slideable plate and said associated pull-down arm, a drive shaft, said first cam being mounted on said drive shaft for rotation thereon, said fixed pilot pin means comprising a pair of fixed pilot pins, one of said pilot pins being a master pilot pin, said pull-down pins being spaced farther apart than said pilot pins, for a distance of one frame of a film, said pilot pins and said pull-down pins being positioned in substantially the same plane, the ends of said pull-down pins being bevelled in opposite directions and the ends of said pilot pins being bevelled in opposite directions, one pair of opposed pull-down and pilot pins being positioned opposite to and in alignment with each other, in one lateral position of the film transport system, and the other pair of pull-down and pilot pins being disposed opposite to and in alignment with each other in another lateral position of the transport system, the bevelled ends of oppositely disposed pilot and pull-down pins being parallel and spaced from each other a distance such that said bevelled ends overlap, to permit transfer of a film from the pilot pins to the pull-down pins, and vice versa.

19. The device as defined in claim 18, said fixed pilot pins being disposed in apertures in said aperture plate and permitting tilting movement of said aperture plate with respect to said pilot pins, said spring biased connection between said pressure plate and said arm including a bracket mounted on and extending outwardly from said hinged arm, at least two studs mounted for slideable movement in apertures in said bracket, the opposite ends of said studs being connected to said pressure plate for supporting said pressure plate adjacent said aperture plate, a compression spring mounted around each of said studs and abutting said pressure plate and said bracket for normally biasing said pressure plate away from said bracket, said means on said hinged arm arranged in contact said aperture plate comprising an outwardly extending lug disposed beneath said aperture plate in the lowermost position of said arm, and after a slight upward movement of said hinged arm makes contact with the outer end portion of said aperture plate to lift same together with said pressure plate, and a second cam mounted on said drive shaft for lifting said hinged arm for transferring said film from said pilot pins to said pull-down pins, and for lowering said hinged arm to transfer said film from said pull-down pins to said pilot pins.

20. The device as defined in claim 19, said pressure plate being tilted slightly with respect to said aperture plate when said lug on said hinged arm makes contact with said aperture plate, said tilted relation being maintained during said lifting and lowering of said hinged arm, said pressure plate being bevelled at its opposite end portions extending beyond the fixed pilot pins, said pressure plate making contact with the film on said aperture plate during downward movement of said hinged arm, at substantially the center of said master pilot pin, and upon further downward movement of said hinged arm, said biased spring connection causes said pressure plate to rock down against the film on the aperture plate until the entire central portion of said pressure plate disposed between said pilot pins is entirely in contact with said film, to iron out same for registration on said fixed pilot pins.

21. The device as defined in claim 20, wherein said pull-down arm is arranged for lateral movement in a plane substantially parallel to the aperture plate when said aperture plate is in its uppermost tilted position, to permit transport of said film laterally parallel to said aperture plate, the forward pair of opposed pilot and pull-down pins being disposed opposite each other during transfer of the film from the pilot pins to the pull-down pins, and the rear pair of opposed pull-down and pilot pins being disposed opposite each other during transfer of the film from the pull-down pins to the fixed pilot pins.

22. The device as defined in claim 20, including a shutter mounted for rotation on said drive shaft below said aperture plate, said shutter being open to permit exposure of said film during the period of inactivation of said hinged arm by said second cam, said slideable plate of said film transport system being activated to reciprocate said pull-down plate back to its initial position while said shutter is open during film exposure.

23. In a camera, a film registration system comprising a base member, pilot pin means, an aperture plate positioned adjacent said pilot pin means, said pilot pin means extending from said base member through said aperture plate, a pressure plate disposed adjacent said aperture plate, said pilot pin means being arranged for positioning film between said aperture plate and said pressure plate, means for tilting said pressure plate with respect to said aperture plate, said last mentioned means including an arm, said aperture plate and said arm hinged on a common axis, said pressure plate mounted on said arm adjacent said aperture plate, a spring biased connection between said pressure plate and said arm, means on said arm arranged to contact said aperture plate during lifting of said arm from its initial position, to lift said aperture plate together with said pressure plate and said film therebetween away from said base member, means associated with said spring biased connection so that during lifting and downward movement of said arm, said pressure plate has a slight tilt with respect to said aperture plate, said pressure plate in said tilted position contacting said film in its seated position on said aperture plate, whereby upon seating of said film on said aperture plate and in registration with said pilot pin means, said pressure plate makes contact with said film on said aperture plate substantially at one point, and then rocks down on the film as the pressure plate returns to its initial position corresponding to the initial position of said arm, until a substantial area of the surface of said pressure plate is in contact with said film.

* * * * *